Aug. 4, 1953  B. R. HART ET AL  2,647,321
ALIGNING APPARATUS
Filed Aug. 20, 1951  2 Sheets-Sheet 1
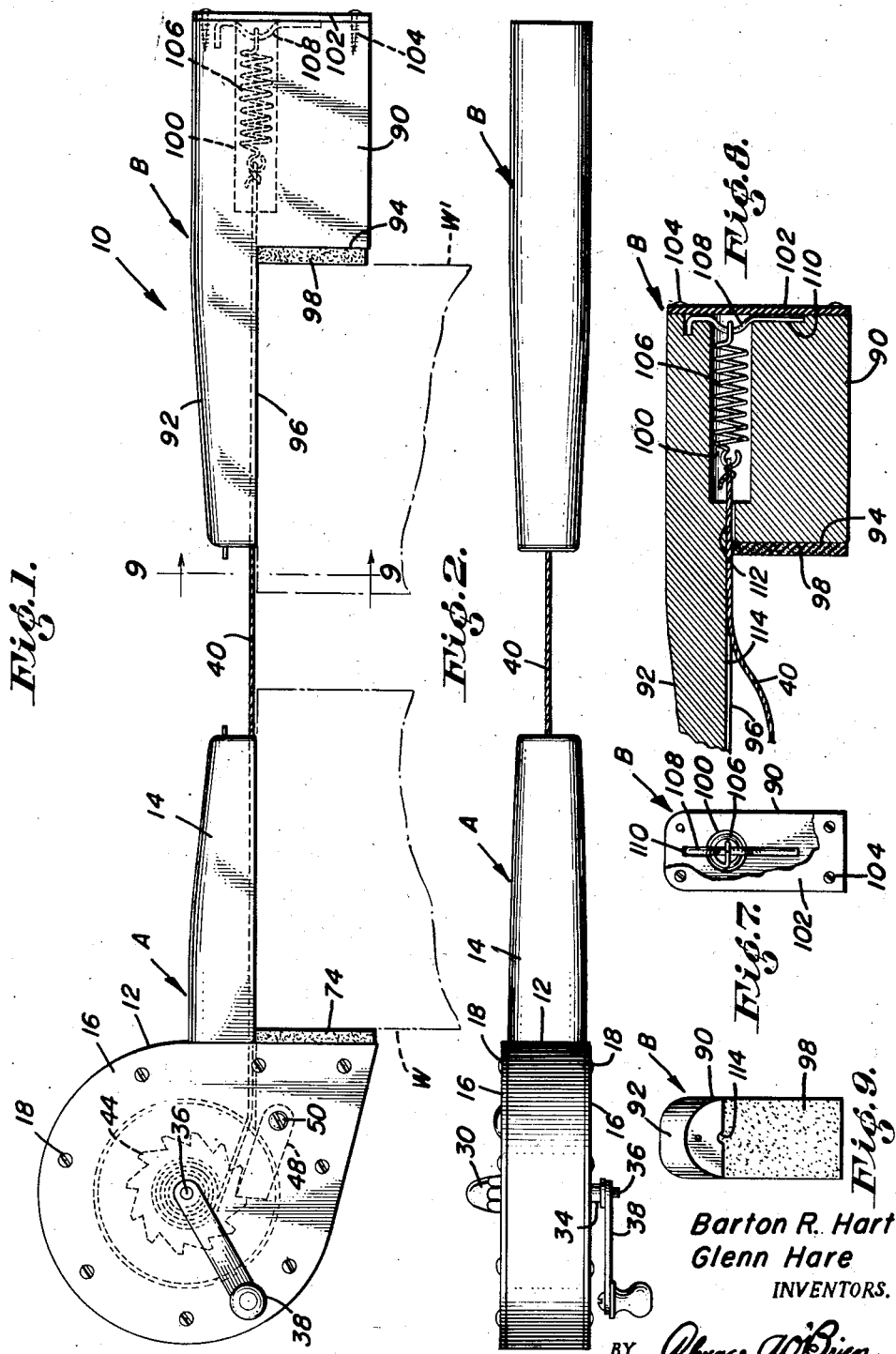
Barton R. Hart
Glenn Hare
INVENTORS.
BY Clarence A. O'Brien
and Harvey B. Jacobson
Attorneys

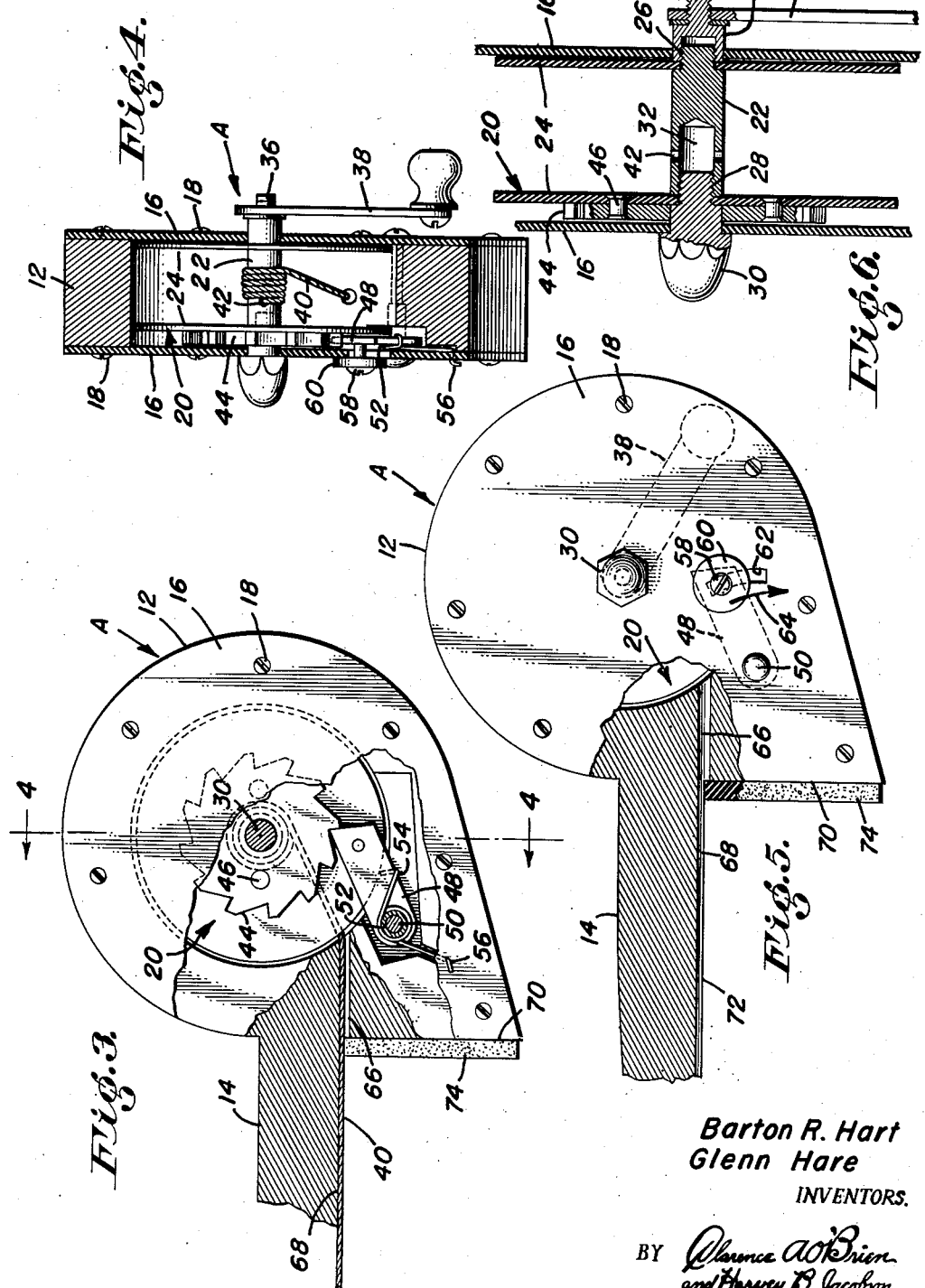

Patented Aug. 4, 1953

2,647,321

UNITED STATES PATENT OFFICE 2,647,321

ALIGNING APPARATUS

Barton R. Hart and Glenn Hare, Rocky Gap, Va.

Application August 20, 1951, Serial No. 242,668

2 Claims. (Cl. 33—85)

This invention relates to new and useful improvements and structural refinements in aligning apparatus, and the principal object of the invention is to provide a device of the character herein described, which may be conveniently and effectively employed as guiding means for laying bricks, building blocks, or the like, this being achieved in such manner that the "line" may be shifted easily and conveniently from one "course" to another without loss of tension and resultant loss of accuracy.

Some of the advantages of the invention reside in its simplicity of construction, in its dependable and accurate operation, in its convenient manipulation and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a side elevational view of the invention applied to the work, the latter being shown by dotted lines;

Figure 2 is a top plan view of the invention per se;

Figure 3 is a fragmentary side elevational view, partially broken away, of one of the units of the apparatus;

Figure 4 is a sectional view, taken substantially in the plane of the line 4—4 in Figure 3;

Figure 5 is a side elevational view, similar to that shown in Figure 3, but illustrating the control means for the ratchet pawl;

Figure 6 is a fragmentary sectional detail of the reel construction;

Figure 7 is an end view, partially broken away, of the second unit of the apparatus shown in Figure 8;

Figure 8 is a longitudinal sectional view of the second unit of the apparatus; and Figure 9 is an end view of the second unit, taken in a direction opposite to that shown in Figure 7, that is, taken in the direction of the arrows 9—9 in Figure 1.

Like characters of reference are employed to designate like parts in the specification and throughout the several views.

Referring now to the accompanying drawings in detail, the aligning apparatus is generally designated by the reference character 10 and embodies in its construction a pair of coacting units, namely, the first unit A and the second unit B.

The unit A embodies in its construction a housing 12 which is formed integrally with an elongated extension 14, the housing being provided with a pair of removable side plates 16 which are secured in position by a plurality of screws 18, as will be clearly apparent.

A reel assembly 20 is rotatably positioned in the housing 12 and consists of a hub member 22 and a pair of spaced flanges 24, one of these flanges being positioned on a screw threaded adapter 26 with which the hub member 22 is provided at one end thereof, while the other flange is positioned on a similar adapter 28 formed integrally with a stud member 30 which is threaded into a bore 32 formed in the member 22 as is best shown in Figure 6.

An internally screw threaded bearing member 34 is provided on the adapter 26 of the hub member 22 and has a diametrically reduced, screw threaded portion 36 on which is mounted a hand crank 38, it being observed that the bearing member 34 and the stud 30 are rotatably journaled in the side plates 16 of the housing 12, so that by simply rotating the hand crank 38, the reel assembly 20 may be rotated within the housing.

A suitable line 40 is windable on the hub member 22 of the reel assembly, the inner end of this line being inserted through one of several apertures 42 into the bore 32 of the hub member before the stud 30 is applied to the hub member during assembly. A knot (not shown) is provided at the inner end of the line 42 within the bore 32, so as to prevent the inner end of the line from being withdrawn.

Means are provided for locking the reel against rotation such as would unwind the line 40 therefrom, these means comprising a ratchet 44 which is secured by suitable rivets 46 to one of the reel flanges 24, while a pawl 48, engageable with the ratchet 44, is pivotally mounted in the housing 12 upon a suitable pin 50.

A suitable spring 52 has one end thereof 54 in engagement with the pawl 48 while the other end 56 of the spring is anchored in a suitable aperture in the housing, whereby to urge the pawl in engagement with the ratchet. However, a stud 58, provided with a head 60, projects outwardly through an arcuate slot 62 in the housing, so that by simply depressing the stud as indicated by the arrow 64 in Figure 5, the pawl 48 may be disengaged from the ratchet to facilitate unwinding of the line 40.

The housing 12 is also formed with a passage 66 communicating with a channel or groove 68 provided in the extension 14, whereby the line 40 is extended outwardly from the housing to the unit B. In this connection it is to be noted that the housing is provided with a flat face 70 which is disposed at right angles to a face 72 of the extension 14, whereby the entire unit A may be applied to a corner of the work, indicated at W in Figure 1. A cushioning pad 74 may be provided on the face 70 of the housing to abut the work, if so desired.

Referring now to the construction of the unit B, the same embodies a housing 90 provided with an elongated extension 92, the housing 90 having a work abutting surface 94 disposed at right angles to a work abutting face 96 of the extension 92, so that the entire unit B may be applied to the opposite corner of the work W'. A cushioning pad 98 may be provided on the surface 94 of the housing 90, if desired.

The housing 90 is provided with a blind bore 100 which is closed by a removable end plate 102, the latter being attached to the housing by suitable screws 104, and a tension spring 106 is positioned in the bore 100, one end of this spring being attached to a keeper bar 108. The latter is disposed in a suitable recess 110 with which the housing 90 is provided and is sustained in position by the removable end plate 102, as is clearly shown in Figure 8.

The other end of the spring 106 is connected to the aforementioned line 40 which extends into the housing 90 through a suitable passage 112 communicating with the bore 100 and a keeper groove 114 is provided in the extension 92 in communication with the passage 112, substantially as shown.

When the apparatus is placed in use, the units A and B are applied to the opposite ends or corners of the work while the line 40 is stretched across the work, this being facilitated by first releasing the ratchet pawl 48 and then rotating the reel 20 so as to wind the line 40 thereon to effect the taking up of any slack therein. The line 40 is tightened to such an extent that the spring 106 is somewhat stretched and thereafter the spring functions to place a certain amount of tension on the line 40, so as to sustain the units A and B in position. It will be readily observed that both units may be shifted from "course" to "course" along the work, without any appreciable loss in tension and accuracy.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. In an aligning apparatus of the type described, the combination of a substantially flat housing including a pair of side plates and having a perimetric wall provided with a flat work engaging surface, said housing defining a circular chamber therein and a recess at the circumference of said chamber, an integral arm-shaped extension provided on the perimetric wall of said housing and having a flat work engaging surface perpendicular to and co-terminal with the first mentioned work engaging surface, said housing being provided with a bore extending from said chamber to a point at the co-terminus of the work engaging surfaces, said extension being provided in the work engaging surface thereof with a longitudinal groove coaxial with and constituting a continuation of said bore, a shaft rotatably journaled in said side plates and extending transversely of said chamber, a reel provided on said shaft, a ratchet wheel provided on the shaft in said chamber and rotatable with said reel, a spring-pressed pawl disposed in said recess and engaging said ratchet wheel, means at the outside of one of said side plates for disengaging said pawl from the ratchet wheel, a crank at the outside of the housing for rotating said shaft, a flexible line connected at one end thereof to said reel and windable thereon, said line extending outwardly through said bore and passing through said groove, and anchoring means at the other end of said line.

2. In an aligning apparatus of the type described, the combination of a substantially flat housing provided with a cylindrical chamber and with a bore disposed at one end of and coaxial with said chamber, an integral arm-shaped extension provided on said housing in substantially parallel relation to the axis of said chamber and having a flat work engaging surface provided with a longitudinally extending groove, said groove being coaxial with and constituting a continuation of said bore, said housing having a flat work engaging surface perpendicular to and co-terminal with the first mentioned surface at the junction of said groove and said bore, the housing being provided at the outer end of said chamber with a pair of diametrically opposed recesses, a keeper pin positioned in said recesses and extending transversely of said chamber, a removable cover plate provided on the housing at the outer end of said chamber and sustaining said pin in said recesses, a tension spring disposed in said chamber and anchored at the outer end thereof to said pin, a flexible line connected at one end thereof to the inner end of said spring, said line extending outwardly through said bore and passing through said groove, and line winding means at the other end of said line.

BARTON R. HART.
GLENN HARE.

References Cited in the file of this patent
UNITED STATES PATENTS

| Number | Name | Date |
| --- | --- | --- |
| 603,157 | Spitzenberg | Apr. 26, 1898 |
| 826,776 | Ferguson | July 24, 1906 |